May 14, 1968     D. F. MOWBRAY     3,382,673

MECHANISMS FOR CONTROLLING SPEED RESPONSIVE GOVERNORS

Filed Dec. 1, 1966     2 Sheets-Sheet 1

3,382,673
MECHANISMS FOR CONTROLLING SPEED
RESPONSIVE GOVERNORS
Dorian Farrar Mowbray, Solihull, England, assignor to
Joseph Lucas (Industries) Limited
Filed Dec. 1, 1966, Ser. No. 598,420
3 Claims. (Cl. 60—39.28)

This invention relates to mechanisms for controlling the actuation of speed responsive governors.

The object of the invention is to provide a mechanism of the kind referred to in a convenient and relatively simple form.

In accordance with the present invention a mechanism for controlling the actuation of a speed responsive governor comprises a member movable linearly by an operator, a lever pivotally mounted on the member, a first spring and a second spring arranged to act on the lever at spaced positions respectively, at least one of the springs transmitting movement of means responsive to a signal to said lever, and means for transmitting movement of the lever to the governor to vary the speed at which it is actuated, the arrangement being such that when the member is in one position, the line of action of the first spring passes through the pivotal connection between the member and the lever, and when in a second position the line of action of the second spring passes through said pivotal connection.

Figure 1:
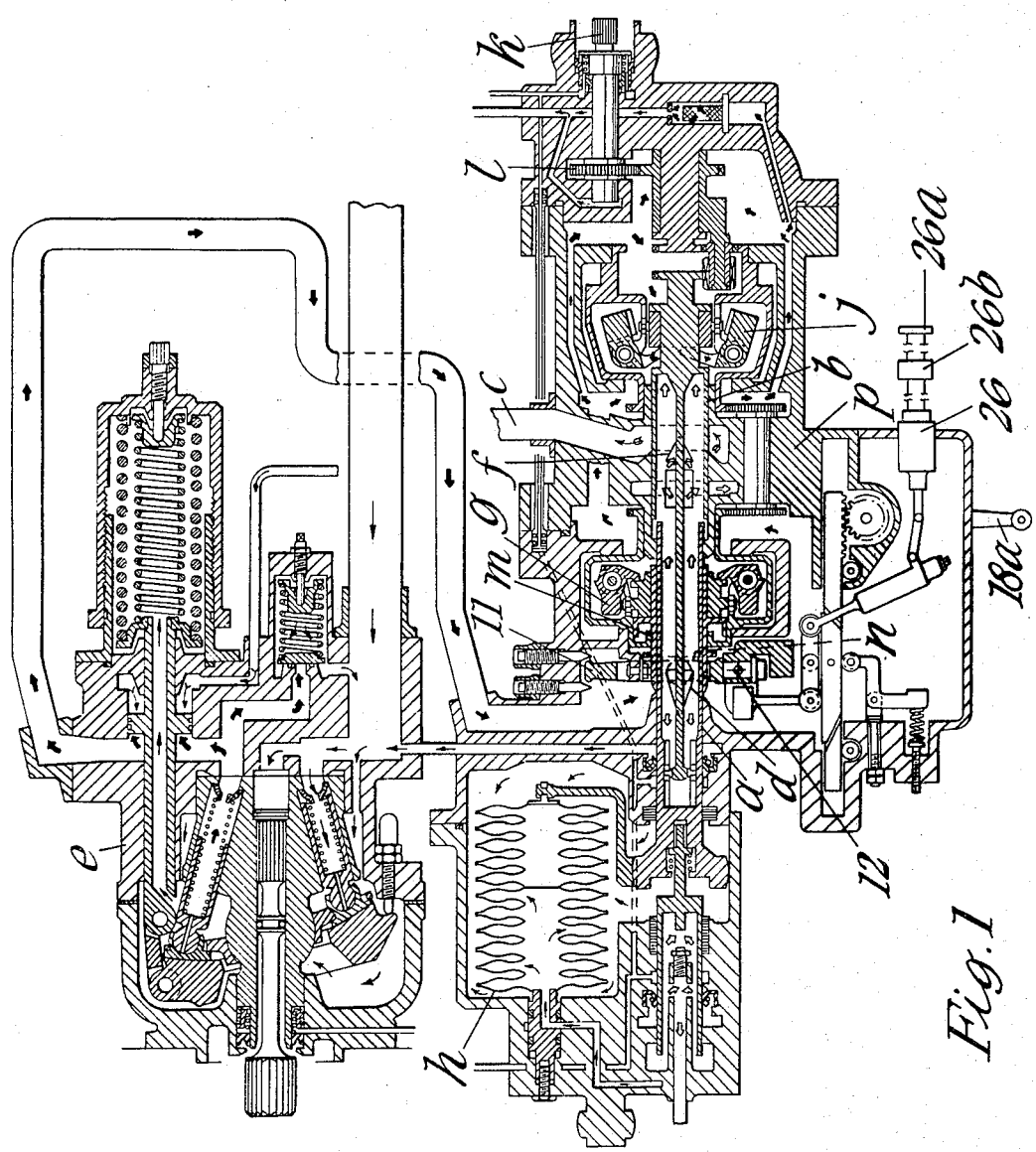
Figure 2:
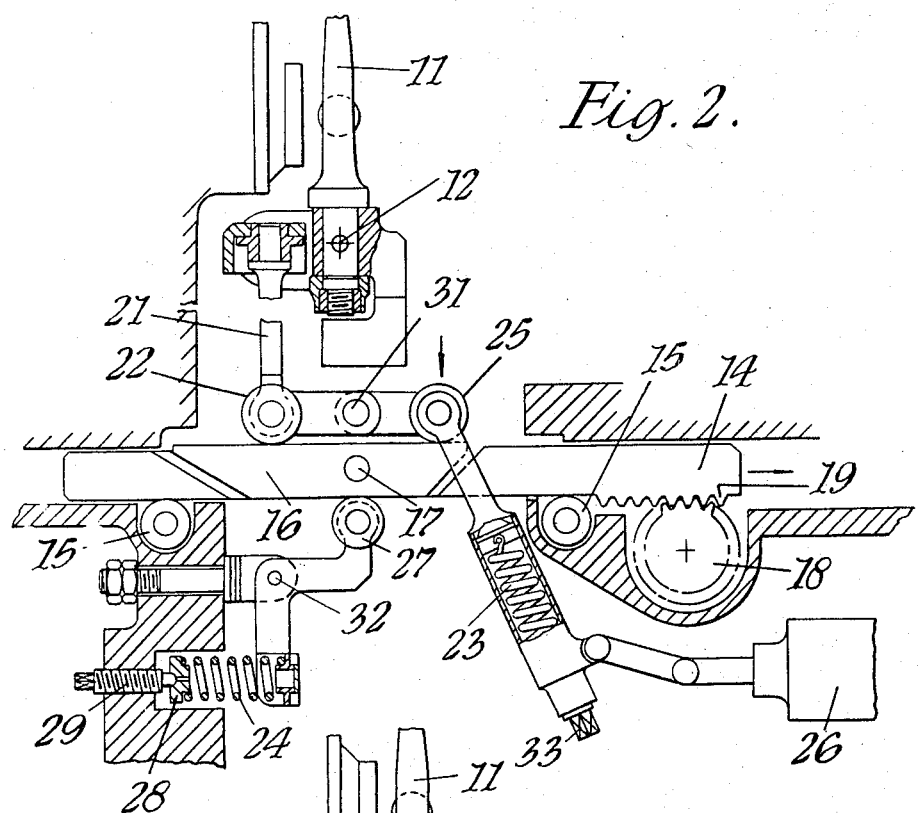
Figure 3:
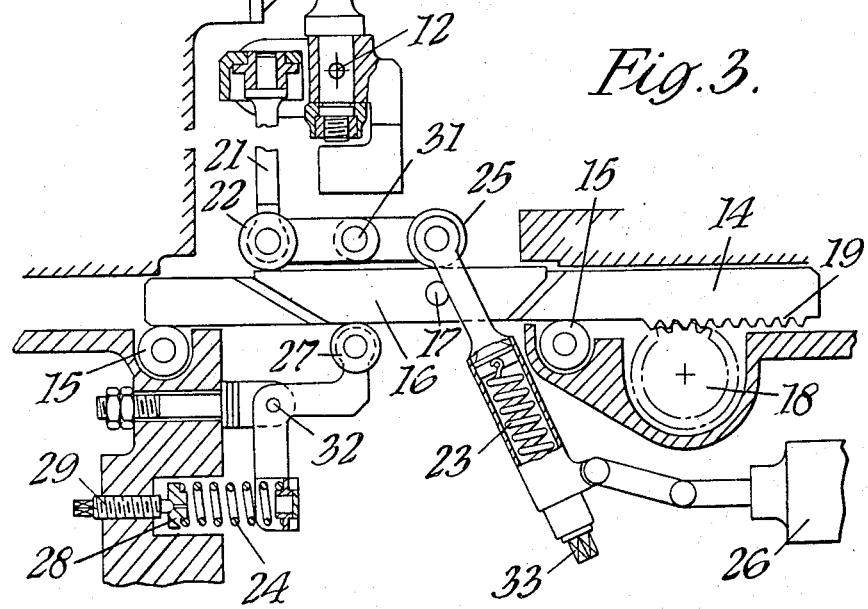

The invention will now be described by way of example with reference to the accompanying drawings in which:

FIGURE 1 is a view of part of a fuel system for a gas turbine engine and incorporating the invention, and FIGURES 2 and 3 are fragmentary views of a portion of the system illustrated in two different positions.

In the example illustrated, there is provided a fuel supply system for a gas turbine engine and including a pair of coaxial axially movable and apertured sleeves a, b, the axial positions of which determine the flow of fuel which can reach the engine, with which the system is associated, through an outlet passage c, the fuel reaching the interior of the sleeves a, b through a set of openings d in the sleeve a from an engine driven pump e and leaving it through a set of openings f in the other sleeve b. Axial positioning of the sleeves a, b is determined in accordance with engine speed, and with pressures derived from the compressor stage of the engine, the former being applied to the sleeve a by a set of rotatable weights g and the latter being applied through a capsule assembly h. There is also a second set of weights j applied to the sleeve b, these weights j being rotated, as are the sleeves a, b and the weights g by the engine, through a shaft k and gearing l. The system thus far described is substantially conventional. The response of the governor weights g upon the flow of fuel through the openings d in the sleeve a is however modified through mechanism forming the subject of this invention, this mechanism being arranged to apply a force through a lever 11 which acts upon an outer sleeve m at n and is pivotally mounted at 12 on fixed structure p of the apparatus. The position of the outer sleeve m, in turn determines the sizes of the openings d available for flow of fuel therethrough.

The apparatus shown in FIGURES 2 and 3 includes means whereby the governor setting can be adjusted by an operator and further means are provided whereby the effect of the operator's setting can be modified in accordance with temperature changes. In this instance the temperature changes are those in the jet pipe or exhaust of the engine, the system of the specific example being intended for use on aircraft.

Referring to the drawings, the operator or pilot can apply a correction to the governor by imparting axial movement to a member 14 which is mounted on rollers 15 to reduce friction, this member having pivotally mounted on it lever 16, the pivotal axis being indicated at 17 and being off-set from the mid-point of the lever 16. Movement of the member 14 is achieved through a pinion 18 engaging a rack 19 formed on the member 14. The pinion 18 is moved by a lever 18a to which the pilot's control is connected.

For transmitting movement of the member 14 to the lever 11 of the governor, there is provided a rod 21 connected at one end to the lever 11 and at its other end carrying a roller 22 bearing on the lever 16.

The position of the lever 16 is normally that in which the surface on which the roller 22 bears is nearly parallel to the direction of travel of the member 14. This position is normally maintained by forces exerted by a pair of springs 23, 24 these forces being balanced against a force derived from the governor and exerted through the lever 11 and the roller 22. The spring 23 acts through a roller 25 and its inclination with respect to the direction of movement of the member 14 is determined by an electrical signal supplied to an electric motor 26 this signal being responsive to temperature changes obtained through a device 26a in the engine exhaust through an amplifier 26b. Thus the leverage of the spring 23 upon the lever 16 is determined by temperature. There is a suitable feed back system (not shown) which cuts off the supply of current to the motor 26 when movement in response to a change in the applied signal has been accomplished.

The second spring 24 is arranged to act on the opposite side of the lever 16 through a roller 27 and is adjusted by means of a movable abutment plate 28 and a screw 29. Furthermore, the spring 23 can be adjusted by means of a screw 33.

To prevent substantial movement of the rollers 22 and 25 in the direction of movement of the member 16, these are connected to a common pivot pin 31 which is mounted on the fixed structure 13. Furthermore, the roller 27 is similarly restrained by a pivot pin 32 on the fixed structure 13.

Should it be desired to change the setting of the governor by moving the member 14 or alternatively should a signal to the motor 26 produce a change in the force exerted on the lever 16 by the spring 23, a change in the balance of the forces will occur to cause limited movement of the lever 16 with respect to the member 14 to transmit movement to the lever 11 to cause the governor to permit a change in the fuel flow. This results in a change in engine speed and a change in the force applied by the governor to the lever 11. This change in the force is sufficient to restore the lever 16 so that its surface on which the ro'ler 22 bears is again nearly parallel to the direction of movement of the member 14.

The member 14 is movable between two limit positions, one of which is shown in FIGURE 2, in which the parts of the mechanism are illustrated in such a position that the spring 24 can have no effect upon the lever 16 since the line of action of the spring 24, through the roller 27 passes through the axis 17 of the pin connecting the lever 16 with the member 14.

To the other limit position, shown in FIGURE 3, the member 14 and lever 16 have been moved to a position in which the spring 23 can have no effect upon the lever 16 since the line of action of this spring 23 now passes through the pivot axis 17. It will be clear that between these positions both springs have some effect. However, the spring 23 is intended to exert a controlling force on the lever 16 when the engine is running at high speeds and the spring 24 is intended to set the governor so that it maintains a required idling speed. Thus, the position of the member 14 shown in FIGURE 2 is that which it occupies when the engine is running at full power and the position shown in FIGURE 3 is the idling position.

Having thus described my invention what I claim as new and desire to secure by Letters Patent is:

1. A mechanism for controlling the actuation of a speed responsive governor comprising a member movable linearly by an operator, a lever pivotally mounted on the member, a first spring and a second spring arranged to act on the lever at spaced positions respectively, at least one of the springs transmitting movement of means responsive to a signal to said lever, and means for transmittting movement of the lever to the governor to vary the speed at which it is actuated, the arrangement being such that when the member is in one position, the line of action of the first spring passes through the pivotal connection between the member and the lever and when in a second position, the line of action of the second spring passes through said pivotal connection.

2. A mechanism as claimed in claim 1 in which one of the springs is arranged to transmit a signal responsive to temperature, to said lever.

3. A gas turbine engine fuel system comprising a pump for supplying fuel to the engine, a fuel flow metering device disposed between the pump and the engine, an engine speed responsive governor arranged to control the flow metering device, and a mechanism for controlling the actuation of the speed responsive governor, said mechanism comprising a member movable linearly by an operator, a lever pivotally mounted on the member, a first spring and a second spring arranged to act on the lever at spaced positions respectively, at least one of the springs transmitting movement of means responsive to a signal to said lever, and means for transmitting movement of the lever to the governor to vary the speed at which it is actuated, the arrangement being such that when the member is in one position, the line of action of the first spring passes through the pivotal connection between the member and the lever and when in a second position, the line of action of the second spring passes through said pivotal connection.

No references cited.

JULIUS E. WEST, *Primary Examiner.*